(12) United States Patent
Phuyal

(10) Patent No.: US 6,502,033 B1
(45) Date of Patent: Dec. 31, 2002

(54) TURN DETECTION ALGORITHM FOR VEHICLE POSITIONING

(75) Inventor: Bishnu P. Phuyal, DesPlaines, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/680,161

(22) Filed: Oct. 5, 2000

(51) Int. Cl.[7] .......................... G01S 5/02; G01C 21/00; H04B 7/185; G06G 7/78
(52) U.S. Cl. ..................... 701/214; 701/208; 340/988; 342/357.13; 342/357.06
(58) Field of Search ................................. 701/214, 216, 701/217, 213, 208, 224, 25; 340/988; 342/357.08, 357.06, 357.13, 357.14

(56) References Cited

U.S. PATENT DOCUMENTS

| | | |
|---|---|---|
| 4,796,191 A | 1/1989 | Honey et al. |
| 4,807,127 A | 2/1989 | Tehmoku et al. |
| 4,814,989 A | 3/1989 | Dobereinder et al. |
| 4,964,052 A | 10/1990 | Ohe |
| 4,999,783 A | 3/1991 | Tenmouku et al. |
| 5,119,301 A | 6/1992 | Shimizu et al. |
| 5,155,688 A | 10/1992 | Tanaka et al. |
| 5,311,173 A | 5/1994 | Komara et al. |
| 5,311,195 A | 5/1994 | Mathis et al. |
| 5,334,986 A | 8/1994 | Fernhout |
| 5,359,529 A | 10/1994 | Snider |
| 5,374,933 A | 12/1994 | Kao |
| 5,422,639 A | 6/1995 | Kobayashi et al. |
| 5,422,815 A | 6/1995 | Hijikata |
| 5,428,545 A | 6/1995 | Maegawa et al. |
| 5,483,456 A | 1/1996 | Kuwahara et al. |
| 5,493,294 A | 2/1996 | Morita |
| 5,508,931 A | 4/1996 | Snider |
| 5,523,765 A | 6/1996 | Ichikawa |
| 5,552,990 A | 9/1996 | Ihara et al. |
| 5,555,503 A * | 9/1996 | Kyrtsos et al. ............... 364/449 |
| 5,838,562 A * | 11/1998 | Gudat et al. ............ 364/424.02 |
| 5,852,791 A | 12/1998 | Sato et al. |
| 6,041,280 A | 3/2000 | Kohli et al. |
| 6,167,347 A | 12/2000 | Lin |
| 6,253,154 B1 | 6/2001 | Oshizawa et al. |

FOREIGN PATENT DOCUMENTS

| WO | WO 00/50917 | 8/2000 |

\* cited by examiner

*Primary Examiner*—William A. Cuchlinski, Jr.
*Assistant Examiner*—Olga Hernandez
(74) *Attorney, Agent, or Firm*—Frank J. Kozak; Lawrence M. Kaplan; Jon D. Shutter

(57) ABSTRACT

A turn detection algorithm is used by a navigation system for determining position and heading of a vehicle relative to a road network represented by a geographic database used by the navigation system. A dead-reckoned position and heading are determined along a plurality of road segments in the road network using sensor measurements of a distance traveled by the vehicle and a change in heading of the vehicle. A vehicle trajectory history is formed and then continuously updated. The vehicle trajectory history includes sensor-derived data representing the vehicle trajectory over a relatively small, chosen distance. The sensor-derived data in the vehicle trajectory history include total turn (i.e., heading change of the vehicle), vehicle state (e.g., travelling straight, turning or reversing in turn direction within a specified small distance) and type of vehicle maneuver. These data represent the trajectory of the vehicle for that distance and are kept in a memory. Corresponding data for the same distance interval are also obtained from GPS measurements and the geographic database. Using the data in the vehicle trajectory history and the corresponding data from the GPS and geographic database, a corrected dead-reckoned position and heading are determined. In addition, using the data in the vehicle trajectory history and the corresponding data from the GPS and geographic database, bias and scale factor correction parameters for the sensors are also obtained.

17 Claims, 5 Drawing Sheets

REPRESENTATION OF GYRO HISTORY

REPRESENTATION OF ROAD GEOMETRY FROM DATABASE

OVERLAY OF GYRO HISTORY OVER MAP

OVERLAY OF GYRO HISTORY OVER MAP

• start/end of data collection

TURN DETECTION ALGORITHM FOR VEHICLE POSITIONING

REFERENCE TO RELATED APPLICATION

The present application is related to the patent application entitled "POSITION DETERMINING PROGRAM AND METHOD," Ser. No. 09/276,377, filed Mar. 25, 1999, and the patent application entitled "VEHICLE POSITIONING USING THREE METRICS," Attorney Docket N0061US, filed on even date herewith, the entire disclosures of which are incorporated by reference herein.

BACKGROUND OF THE INVENTION

The present invention relates to a program and method used by a navigation system installed in a vehicle to determine in real time the position and heading of the vehicle relative to data contained in a database that represents the road network on which the vehicle is traveling.

In-vehicle navigation systems provide a variety of useful features to end users (i.e., the drivers and/or passengers of the vehicles in which the navigation systems are installed). Included among the features that are provided by some in-vehicle navigation systems are route calculation, route guidance, emergency roadside services, electronic yellow pages, and so on. In order to provide these kinds of features, in-vehicle navigation systems use geographic data. The geographic data may be stored in the vehicle in which the in-vehicle navigation system is installed or alternatively, some or all of the geographic data may be stored remotely and made available to the navigation system in the vehicle through a wireless communication system which may be part of the navigation system. The geographic data include information about features in a covered geographic region. The geographic data include information about the location of roads, the speed limits along roads, turn restrictions at intersections, the names of roads, the address ranges along roads, the locations of points of interest, and so on.

Some of the features provided by in-vehicle navigation systems require that the position of the vehicle be determined. There are several considerations related to determining the position of the vehicle. For example, a GPS system may be used to obtain the geographic coordinates of the vehicle. However, the geographic coordinates only indicate the position of the vehicle relative to the surface of the earth. For some of the features provided by in-vehicle navigation systems, a means is required to determine the vehicle position relative to the road network represented by the geographic database used by the in-vehicle navigation system. In other words, if the vehicle is located on a road segment, a means is required to identify the road segment represented by data contained in the geographic database used by the in-vehicle navigation system, and position and direction of the vehicle along the represented road segment. Once the vehicle position is determined relative to the road segment represented by the geographic database, programming in the in-vehicle navigation system can be used to provide various features, such as determining a route to a desired destination, providing maneuvering instructions for reaching the destination, identifying the closest restaurant or gas station relative to the vehicle position, displaying a map of the area around the vehicle, and so on.

In order to determine a vehicle position relative to roads represented by data in the geographic database, a navigation system can use data output from a GPS system and inertial sensors. However, the outputs of GPS systems and inertial sensors may include measurement errors that may yield incorrect positions and headings.

U.S. patent application Ser. No. 09/276,377, filed Mar. 25, 1999, discloses a method for determining a vehicle position relative to a road segment represented by data in a geographic database used by a vehicle navigation system. The method disclosed in Ser. No. 09/276,377 works well for many kinds of roads. However, there continues to be room for improvements. Accordingly, there is a need for an improved vehicle positioning program and method.

SUMMARY OF THE INVENTION

To address these and other objectives, the present invention comprises a program and method for determining position and heading of a vehicle relative to a road network represented by a geographic database. A dead-reckoned position and heading are determined along a plurality of road segments in the road network using sensor measurements obtained over a distance traveled by the vehicle. A vehicle trajectory history is formed and continuously updated. The vehicle trajectory history includes sensor-derived data representing the vehicle trajectory over a relatively small, chosen distance. The sensor-derived data in the vehicle trajectory history include total turn (i.e., heading change of the vehicle), vehicle state (e.g., travelling straight, turning or reversing in turn direction within a specified small distance) and type of vehicle maneuver. These data represent the trajectory of the vehicle for that chosen distance. Corresponding data for the same distance interval are also obtained from GPS measurements and the road database. Using the data in the vehicle trajectory history and the corresponding data from the GPS and road database, a corrected dead-reckoned position and heading are determined. In addition, using the data in the vehicle trajectory history and the corresponding data from the GPS and the road database, bias and scale factor correction parameters for the sensors are also determined.

DETAILED DESCRIPTION OF THE PRESENTLY PREFERRED EMBODIMENTS

I. EXEMPLARY NAVIGATION SYSTEM PLATFORM/ENVIRONMENT

Figure 1:
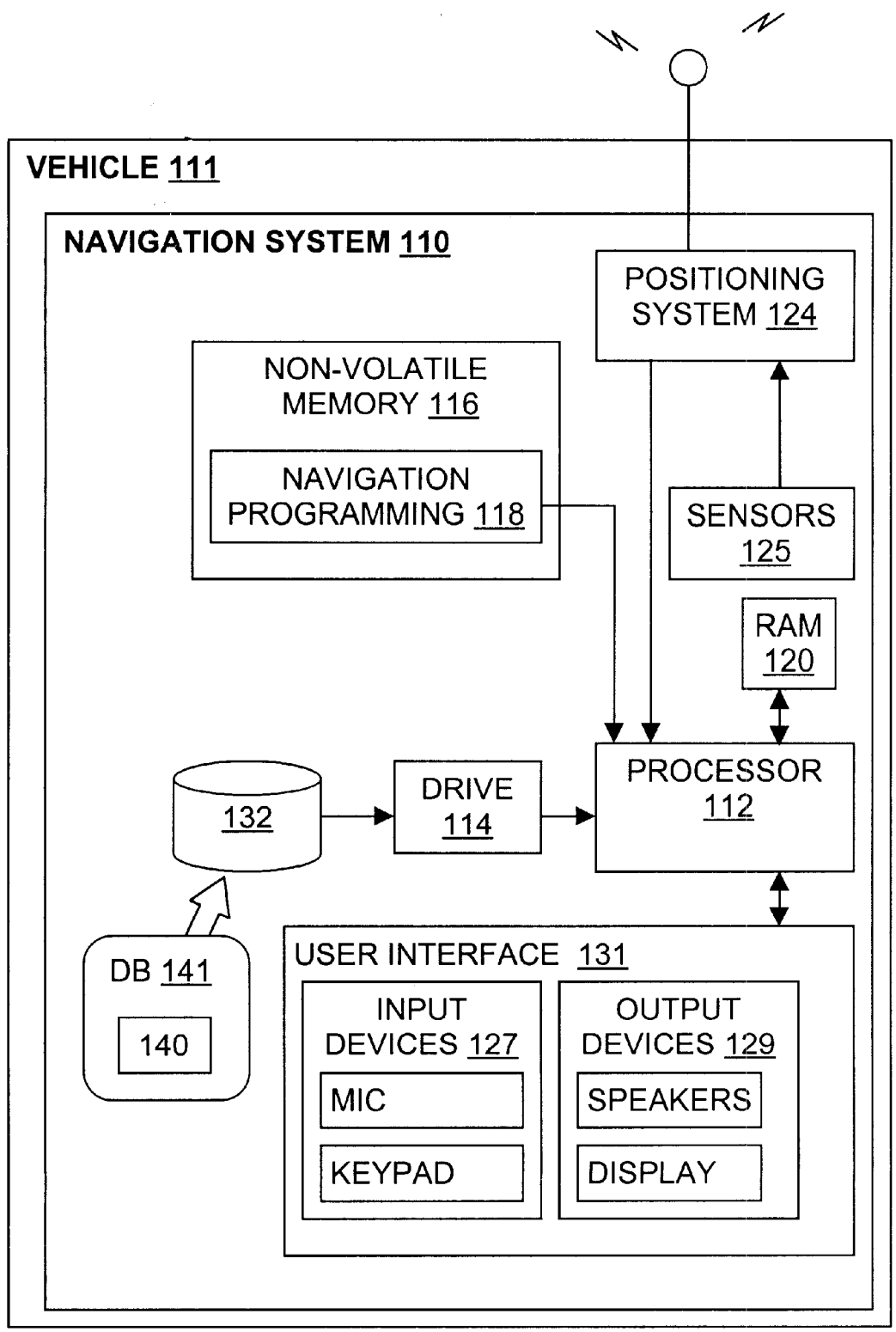
FIG. 1 is a block diagram illustrating a navigation system.

Referring to FIG. 1, there is a diagram illustrating an exemplary embodiment of a navigation system 110. In the embodiment shown in FIG. 1, the navigation system 110 is a portable system located in a vehicle 111, such as an automobile, truck, or bus. In other embodiments, the navigation system 110 may be installed in other platforms.

The navigation system 110 is a combination of hardware and software components. The hardware components of the navigation system 110 may include a processor 112, memory 120, and so on. In the embodiment of FIG. 1, the navigation system 110 also includes positioning system hardware 124 that collects data used to determine the position of the vehicle 111 in which it is installed. The positioning system hardware 124 may include sensors 125 or other components that sense the speed, orientation, direction, and so on, of the vehicle 111. The positioning system hardware 124 may also include a GPS system.

The navigation system 110 also includes a user interface 131. The user interface 131 includes appropriate means 127 for receiving instructions and/or input from an end user of the navigation system. For example, the user interface 131 may include an input panel, keyboard, microphone, voice recognition software, and so on, through which the end user may request navigation information. The user interface 131 also includes appropriate means 129 for providing information back to the end user. The user interface 131 may include a display or speakers (including speech synthesis hardware and software) through which the end user can be provided with information from the navigation system 110.

All of the components described above may be conventional (or other than conventional) and the manufacture and use of these components are known to those of skill in the art.

II. THE GEOGRAPHIC DATABASE

In order to provide navigation features to an end user, the navigation system 110 uses geographic data 140. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location. In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed.

In one embodiment, the storage medium 132 is a CD-ROM. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may be in the form of one or more computer-readable data files or databases 141. The geographic data 140 include information about the roads and intersections in or related to one or more geographic regions or coverage areas. This information includes data specifying the positions of the roads in the covered geographic region and also includes data about features relating to the roads, such as restrictions on directions of travel on the roads (e.g., one-way streets), turn restrictions, street addresses, street names, speed limits, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 141 may include other data about the geographic region.

The geographic database 141 may take a variety of different forms. In one embodiment, the geographic database 141 contains a plurality of road segment data entities. Each road segment data entity represents a portion (or segment) of a navigable road in the geographic region. In one type of geographic database 141, there is at least one database entry (also referred to as "entity" or "record") for each road segment represented in a geographic region. Each physical road segment has two nodes associated with it, one at each of the endpoints of the road segment. In this embodiment, the geographic data 140 also includes a plurality of data entities that represent these nodes. Each node data entity identifies the position (e.g., geographic coordinates) of one of the nodes at the end of a road segment.

Figure 2:
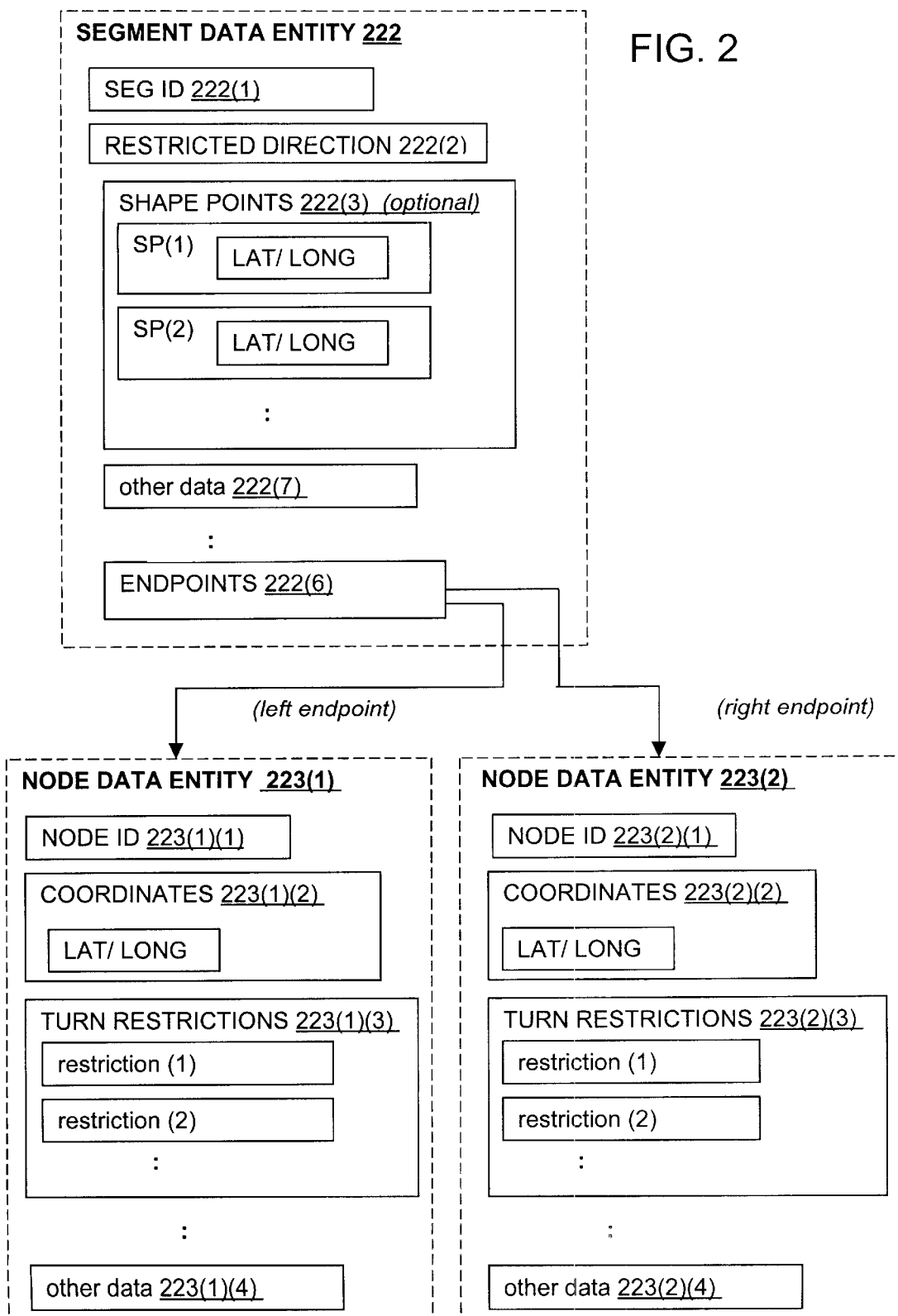
FIG. 2 is a block diagram illustrating components of a road segment data entity included in the geographic database depicted in FIG. 1.

Data are associated with each road segment data record to describe features or characteristics of the represented road segment. FIG. 2 illustrates some of the components of a road segment data entity 222 included in the geographic database 141. The road segment entity 222 includes a segment ID 222(1) by which the record can be identified in the geographic database. The road segment data entity 222 may also include data 222(2) that indicates the direction of vehicular travel permitted on the represented road segment.

The road segment data entity 222 also includes data 222(6) providing the geographic coordinates (e.g., the latitude and longitude) of the endpoints of the road segment. In one embodiment, this data 222(6) is a reference to node data entities 223(1) and 223(2) defined for the nodes corresponding to the endpoints of the represented road segment. Also associated with the road segment data entity 222 are data 223(1)(3) and 223(2)(3) indicating what, if any, turn restrictions exist at each of the endpoints of the road segment.

The road segment data entity 222 may also include one or more shape points 222(3). Each shape point 222(3) includes a pair of geographic coordinates through which the represented road segment passes between the endpoints thereof. The shape points may be used when the road segment is other-than-straight to define the shape of the represented road segment.

The various attributes associated with a road segment may be included in a single road segment record, or may be included in more than one type of record which are cross-referenced to each other. (The term "segment" represents only one terminology for describing this physical geographic feature and other terminology for this kind of feature is intended to be encompassed within the scope of these concepts.)

The road segment record 222 may also include or be associated with other data 222(7) that include or refer to various other attributes of the represented road segment. These other attributes may include the street address range along the represented road segment, the name of the road of which the represented road segment is a part, the highway designation of the road of which the road segment is a part, the speed limit along the road segment, the rank classification of the road segment, and so on.

In one embodiment, the geographic data are provided by Navigation Technologies Corporation of Rosemont, Illinois.

However it is understood that the inventive concepts disclosed herein are not restricted to any particular source of data.

III. THE NAVIGATION PROGRAMMING

Figure 3:
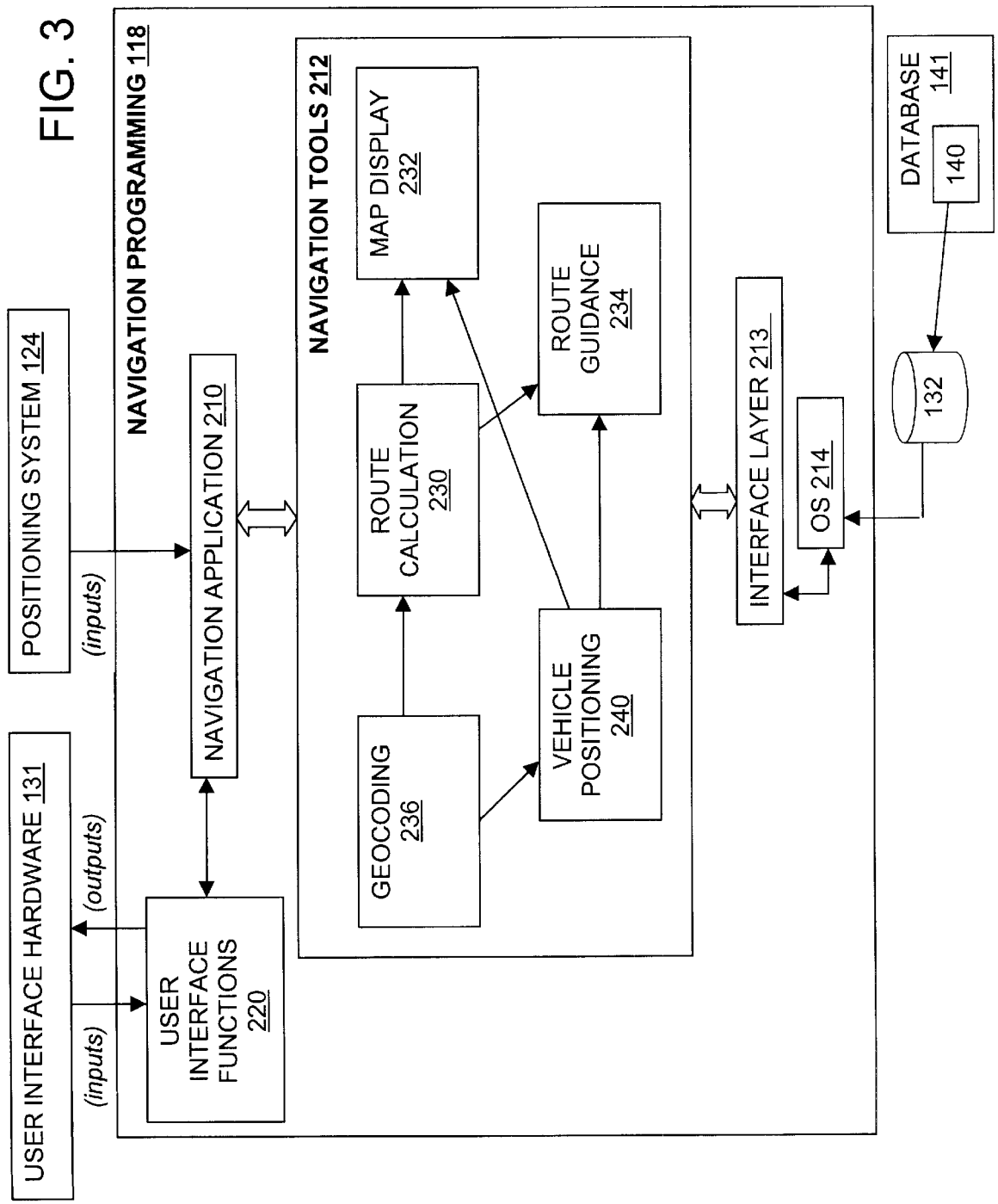
FIG. 3 is a block diagram illustrating components of the navigation programming depicted in FIG. 1.

Referring to FIGS. 1 and 3, in addition to the hardware components and geographic database, the navigation system 110 includes or uses navigation programming 118. The navigation programming 118 includes the software that provides for the functions and/or features performed by the navigation system 110. The navigation programming 118 uses the geographic data 140 in conjunction with input from the user interface 131, and possibly in conjunction with outputs from the positioning system hardware 124, to provide various features and/or functions.

The navigation programming 118 may be stored in a non-volatile storage medium 116 in the navigation system 110. Alternatively, the navigation programming 118 and the geographic data 140 may be stored together on a single storage device or medium. Alternatively, the navigation programming 118 may be located at a remote location and may be provided to or accessed by the navigation system 110 over a communications system.

According to one embodiment, the navigation programming 118 is formed of separate component applications (also referred to as programs, subprograms, routines, or tools). The component applications of the navigation programming 118 may work together through defined programming interfaces. FIG. 3 shows a block diagram illustrating some of the component applications for one embodiment of the navigation programming 118 included in the navigation system 110 of FIG. 1. FIG. 3 shows only a portion of all the component applications that make up the navigation programming 118. Other component applications, programs or tools may be included in the navigation programming 118.

In the embodiment shown in FIG. 3, the navigation programming 118 is shown to include a navigation manager application 210 and one or more navigation tools 212. The navigation manager application 210 is a program or routine that provides for overall management of the functions of the navigation system 110. The navigation manager application 210 may also include support for and interfaces to the navigation system hardware, such as the positioning system hardware 124 and the user interface 131. For this purpose, the navigation manager application 210 shown in FIG. 3 includes user interface functions 220. These user interface functions 220 may provide for presenting a menu to the end user on a screen display of the user interface hardware 131, accepting inputs from the end user via the user interface hardware 131, displaying results to the end user on a screen display of the user interface hardware 131, and so on.

The navigation tools 212 are modular software libraries that provide for specific navigation functions to the performed by the navigation programming 118. In the embodiment of FIG. 3, the navigation tools 212 are programs that provide for functions that use the geographic data 140. According to one embodiment, the features or functions provided by the navigation tools 212 include route calculation 230, map display 232, route guidance 234, geocoding 236, and vehicle positioning 240. In alternative embodiments, the navigation tools 212 may provide more or fewer functions. The navigation tools 212 receive requests for navigation information from the navigation manager application 210. The navigation tools 212 request and obtain data 140 from the geographic database 141 and use the data to satisfy the requests for navigation information from the navigation manager application 210. The navigation tools 212 may obtain the geographic data 140 directly from the geographic database 141 on the medium 132 or alternatively, the navigation tools 212 may obtain the data 140 through an interface layer 213 and an operating system 214. In one embodiment, the navigation tools 212 are written in the C programming language although in alternative embodiments other programming languages may be used, such as C++, Java, Visual Basic, and so on.

IV. VEHICLE POSITIONING

A. Overview

As stated above in connection with FIG. 3, the vehicle positioning tool 240 is one of the software libraries that may be included among the navigation tools 212. The vehicle positioning tool 240 determines the position of a vehicle relative to the geographic data 140 in the map database 141. In addition, the vehicle positioning tool 240 determines whether the vehicle is on or off the road network represented by the data 140 in the geographic database 141.

Upon calculating the new vehicle position, the vehicle positioning tool 240 provides an output (250 in FIG. 4) that represents the instantaneous location of the vehicle 111 with respect to the geographic data 140 in the geographic database 141, if the vehicle is on the road network. This output can be used by the map display tool 232, the route guidance tool 234, the geocoding tool 236, or directly by the navigation manager application 210.

While performing the positioning function, the vehicle positioning tool 240 obtains map data 294 from the map database 141, as needed. The map data 294 may be obtained through the interface layer 213 and/or the operating system 214 from the storage medium 132.

B. Calls for Vehicle Position

Figure 4:
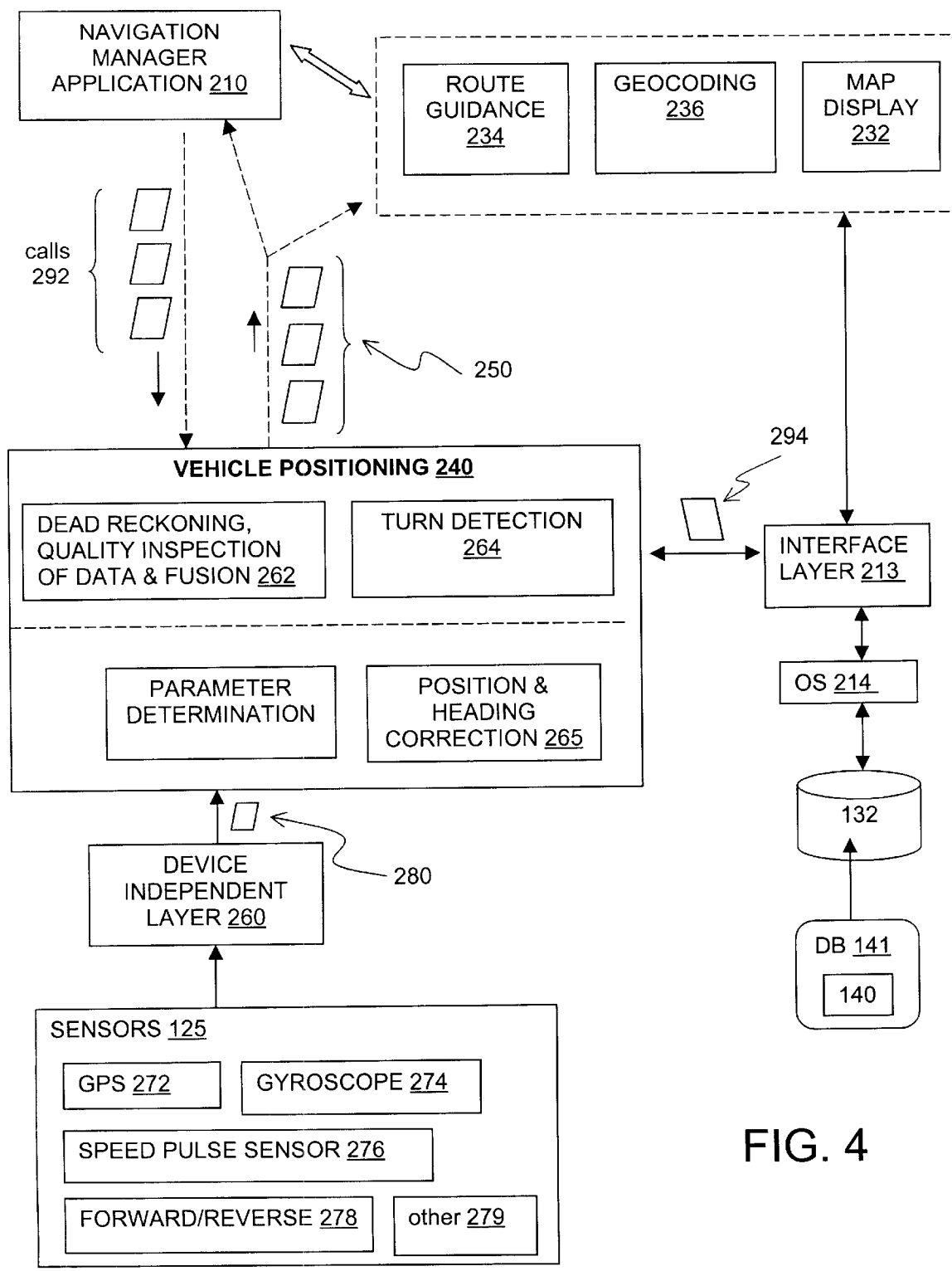
FIG. 4 is a block diagram illustrating components of the vehicle positioning tool program shown in FIG. 3.

Referring to FIG. 4, according to one embodiment, as the vehicle travels in the geographic region, the vehicle positioning tool 240 receives calls 292 from the navigation manager application 210 requesting data identifying the vehicle position. Accordingly, the navigation manager application 210 includes appropriate programming that periodically (or non-periodically) generates and sends a request to the vehicle positioning tool 240 for an updated, current vehicle position. These requests may be generated and sent at various configurable time intervals. These time intervals may include once per second, ten times per second, once every two seconds, or any other time interval, or as needed. The time interval may be selected to be consistent with the computing resources of the navigation system. The time interval may also be selected so that it is consistent with the navigation manager application(s) being supported. For example, safety-related applications, such as obstacle avoidance, may require that the vehicle position be updated more frequently than other kinds of applications, such as map display.

In alternative embodiments, the requests for updated, current vehicle positions may come from another program, such as one of the navigation tool programs 212. Alternatively, the requests for updated, current vehicle positions may be generated by a standalone timing module. In another alternative embodiment, the vehicle positioning tool 240 may generate its own requests for an updated vehicle position internally. Thus, instead of responding to a series of requests for a current vehicle position, the vehicle positioning tool 240 may continuously and/or regularly provide and update a data output indicative of the vehicle position, which is then accessed and used, as needed, by any other program, such as the navigation manager application 210.

C. The Device Independent Layer and the Sensors

In the embodiment shown in FIG. 4, the vehicle positioning tool 240 obtains sensor data from a device independent layer (or "device layer") 260. The device independent layer 260 manages sensor data and converts the sensor data into a device independent format that can be utilized by the vehicle positioning tool 240. Sensor outputs from different sources (e.g., manufacturers) may have different formats. For example, sensor outputs from different manufactures may have different voltages, different numbers of output bit resolutions, different timings, etc. The device independent layer 260 provides the advantage that the vehicle positioning tool 240 is able to accommodate different kinds of sensors from different manufacturers or different models of sensors from the same manufacturer.

In one embodiment, the vehicle positioning tool 240 uses the outputs of the following kinds of sensors 125: a GPS receiver 272, a gyroscope 274, a speed pulse sensor 276, and a forward/reverse sensor 278. (The vehicle positioning tool 240 can use other kinds of sensors 279 in addition to these, such as an accelerometer or differential wheel speed sensors.)

The GPS (Global Positioning System) receiver 272 uses signals from a constellation of a plurality of satellites to compute the position of the GPS receiver 272 relative to the earth. The GPS satellites transmit signals on different frequencies. These signals are received by the GPS receiver 272. The position reported by the GPS receiver 272 is an estimate of the true position on the earth. The reported position may be in error or inaccurate due to such factors as multipath interference, atmospheric distortion, and so on.

The gyroscope 274 is a type of sensor that reports the angular velocity of the vehicle 111. The output of the gyroscope 274 is at or close to a known, factory-specified value when the vehicle 111 is at rest or traveling in a straight line.

The speed pulse sensor 276 is a type of sensor that indicates the speed of the vehicle 111. The speed pulse sensor 276 outputs a number of speed pulses per sample time. The number of pulses reported by this sensor per sample time is proportional to the speed of the vehicle 111. This value is used to compute the distance traveled by the vehicle 11 for the sample time.

The forward/reverse sensor 278 provides an indication whether the vehicle 111 is travelling in a forward direction or in a reverse direction.

The outputs of these sensors 125 may be affected by many variable factors, such as the ambient temperature, the age of the sensor, and the stability of the power supply as well as other factors that are difficult or impossible to control. Accordingly, the vehicle positioning tool 240 treats sensor measurements as approximations. In one embodiment of the vehicle positioning tool 240, the sensor measurements can be treated as random variables.

The device independent layer 260 converts or otherwise transforms the outputs from the various sensors 125 into a predetermined format. The outputs of the various sensors are included in an output 280 of the device independent layer 260. The output 280 is passed to the vehicle positioning tool 240. Various sensors in the device independent layer 260 may generate data at different times or periods. In one example, the gyroscope 274, and the forward/reverse sensor provide outputs every 0.1 second and the GPS receiver provides an output every second.

D. Operation of the Vehicle Positioning Tool (1). Dead-reckoning and Fusion Functions Functions performed by the vehicle positioning tool 240 include parameter determination, dead reckoning, and data fusion (whereby the various outputs received from the device independent layer are combined).

According to one embodiment, when the vehicle positioning tool 240 performs the dead-reckoning function 262 (in FIG. 4), it uses data (specifically, the gyroscope and speed pulse data) from the device independent layer 260 to compute the distance traveled and heading change. Estimates of the current dead-reckoned position and heading of the vehicle are determined. Estimates for the position and heading of the vehicle are also determined using GPS data, if available for the time period. The estimates obtained using dead-reckoning and the estimates obtained using GPS are compared to determine whether the GPS data have large errors. Preferably, a few previous epochs are included in this comparison for better validation of GPS coordinates and heading. Results of the comparison are used to determine how much weight to assign to the GPS data. Then, the dead-reckoned and GPS results are fused using a Kalman filter to get final estimates of the current vehicle position and heading and their variances.

The dead-reckoned position and heading obtained in this manner may include accumulated errors. GPS data may not always be available for correcting the errors in the dead-reckoned position and heading. For example, a GPS signal may be unavailable due to signal blockage. Alternatively, the GPS data may be incorrect or inaccurate. Moreover, even if the dead-reckoned position and heading results are accurate, the vehicle position and heading obtained from dead reckoning may not be the position and heading needed by the navigation system. For example, the position needed for display on the screen of the navigation system is a point on the line indicating the road segment as represented by data contained in the geographic database used by the navigation system with a heading equal to the road segment heading.

To address these issues, the present embodiment includes a turn detection algorithm (264 in FIG. 4). The turn detection algorithm is used to provide corrections to the dead-reckoned (or fused) vehicle position and heading on a regular basis and to accurately determine the position and heading of the vehicle required by the navigation system. The data derived using the turn detection algorithm are also used to determine sensor bias and scale parameters dynamically.

(2). The Turn Detection Algorithm

Heading is obtained using angular speed of the vehicle as sensed by the gyroscope. Actual values obtained from the gyroscope are instantaneous measurements representing the angular speed of the vehicle in units of millivolts. These values are converted to the angular speed, change in heading, and heading, using the relationships set forth in the following equations (1), (2), and (3), respectively.

$$\Delta \dot{H} = \frac{V - V_0}{S} \quad (1)$$

$$\Delta H = \Delta \dot{H} \Delta t \quad (2)$$

$$H_i = H_0 + \sum_i \Delta H \quad (3)$$

where V is the measured millivolts output of the gyroscope, $V_o$ is the zero-point output in millivolts of the gyroscope, S is the scale factor of the gyroscope, $\Delta t$ is the data rate (sampling frequency), $H_i$ is the heading at epoch i, and $H_0$ is the initial heading.

The readings for angular velocity may be affected by various errors, such as input voltage fluctuations, temperature changes, electronic noise, non-verticality, etc. Accumulation of these errors can make the heading, and thus the dead-reckoned position, incorrect.

According to the present embodiment, error growth is controlled by implementation of the turn detection algorithm 264, which is a part of the vehicle positioning tool 240. The turn detection algorithm 264 is used for continuous and accurate calculation of vehicle position and heading. This algorithm determines heading changes for a given distance from the gyroscope output and also sets a vehicle-state flag to indicate whether the vehicle is turning or traveling straight. Because heading change is based on gyroscope readings for the chosen distance, the value does not accumulate large errors during this distance traveled by the vehicle. In this embodiment, the turn detection algorithm 264 provides a means to determine correction values for both heading and position. It also provides required data to determine bias and scale factor parameters for the sensors (gyroscope and wheel sensor). The algorithm can determine the heading change (from equation 2, above) and vehicle state for the chosen distance traveled. These two quantities, heading change for the given distance and vehicle state, contain information about the trajectory of the vehicle. By knowing the vehicle state at all times, the heading change for the distance, and their history together, a strong comparison can be made between this data and corresponding data from the geographic database. Additionally, this algorithm can also be used to determine completion of a given amount of heading change.

According to one embodiment, the categories of vehicle state that are determined include traveling straight and turning. Alternatively, the categories of vehicle state that are determined may also include simple maneuvers, small turns, medium turns, and large turns.

According to this embodiment, the turn detection algorithm 264 determines correction factors for both the heading and positional errors when used in conjunction with the geographic database. Histories of the heading-change at different instances are correlated with the heading change at different points based on the road geometry represented in the geographic database. This correlation is calculated by finding the difference in the sensor-derived heading change compared to the heading change derived from the road segment (as represented by the geographic database). When this difference and the vehicle state conforms to what can be expected in the database at that location, correction to the dead-reckoned heading is applied. This can also be used for correction of the vehicle position. Using a history generated for a longer distance (instead of using a single value) results in a stronger correlation of the vehicle trajectory on the geographic database with little or no ambiguity.

The turn detection algorithm 264 is described below with some examples to illustrate its effectiveness.

The turn detection algorithm can be stated as follows: heading change for a chosen distance or time interval is obtained from accumulating gyroscope readings. Heading changes are accumulated over a small chosen distance because it is unnecessary to keep a history of heading changes for all gyroscope measurements. In a general sense, these readings describe the vehicle trajectory and information on the vehicle state. For effective and unambiguous comparison with the road geometry (as represented by the geographic database), a portion of the vehicle trajectory history is kept. However, the portion is preferably limited to limit effects on memory and efficiency requirements. Neither a long history nor all individual gyroscope readings are required to determine how large the heading changes were that took place for a given length of the history. Included in the history is information about where the maximum turn took place and what was the direction of the heading change (clockwise or counter clockwise).

When the vehicle state is turning, an exceptional case occurs when a vehicle changes angular rotation from clockwise to counter clockwise, or vice versa, significantly during a small distance of vehicle travel. The turn detection algorithm detects this exceptional case of the vehicle by constantly evaluating the accumulated heading change values.

According to one exemplary embodiment of the turn detection algorithm, a distance of 25 meters or more is chosen to collect the turn detection data and a length of an array can be six. A different distance threshold and array size to store the data can be chosen. Similarly, different threshold values for categorizing vehicle state as travelling straight, turning complete or reversal in turning can be chosen. According to an alternative embodiment, these values may be configurable so that appropriate values can be used depending on hardware resources, etc.

(1). Quantities accumulated for turn detection. The following quantities are populated in the array as soon as dead reckoning begins and the next array is populated when the distance traveled becomes greater than chosen distance (e.g., a default distance of 25 meters), or the conditions discussed below (conditions 3 and 4) are satisfied indicating the completion of a turn: gyroscope readings, counts of gyroscope readings, delta gyroscope readings (subtracted from zero-point value), heading change (equation 2, above), maximum values of the gyroscope readings, minimum values of the gyroscope readings, the heading of the segment from the map where the vehicle lies currently, and the heading determined from dead reckoning. Once the last element of array is populated, the first elements of each of the above quantities are deleted and the following five are moved up leaving the last one available for the next interval.

(2). Distance for which data is generated. When the distance traveled exceeds the chosen threshold (e.g., 25 meters), the incoming data are placed in the next available slot of the respective array. Two exceptions to this rule occur. A first exception occurs when the past accumulated delta gyroscope reading is less than a threshold (such as 200 millivolts which corresponds to about 1 degree turn) and the current value exceeds another threshold (such as 200 millivolts, see condition 3, below). When this occurs, a flag is set indicating the start of the vehicle state as turning. The other exception occurs when there is a reversal in rotation (see condition 4, below). Otherwise, the vehicle state remains as straight. The distance for which the quantities are obtained is also kept in an array.

(3). Vehicle-state flag. In one implementation, two fundamental vehicle states are used: straight and turning (equivalently, turn start). When the past accumulated delta gyroscope reading is less than a threshold (such as 200 millivolts which corresponds to about 1 degree turn) and the current value exceeds another threshold (such as 200 millivolts) irrespective of distance travel, a flag is set indicating the vehicle state as turning. The other exception occurs when there is a reversal in rotation (see condition 4, below). Similarly, the vehicle state is set to turn-complete when the current value is less than a threshold (such as 200 millivolts) as soon as the distance traveled is greater than a threshold (such as 10 meters) with the condition that the vehicle state was turning. (4). Reversal in rotation flag. In some situations, two portions (one forward and one backward) of a road are connected by a short segment. In reality, this will be a small section of a road where the road geometry changes from concave to a convex or vice versa.

Such a situation may also occur while driving when a vehicle is maneuvered through reverse turns, followed one after the other, during a small distance traveled irrespective of whether the vehicle is on a road formed of small segments of opposite turns. Gyroscope readings at such locations indicate rapid change from clockwise to counter clockwise or vice versa. When the delta angular velocity for the current and the last array are opposite in sign and both are greater than a threshold (such as 500 millivolts which corresponds to about 2.5 degree), a flag indicating reversal in rotation is set. This determines heading changes of opposite signs and sets flags for turn completion and turn start. This information can be very useful for calculating the position correction. It should also be noted that turn completion and turning occur (vehicle-state flag changes from turn complete to turning) at the same time in such a case.

(5). Accumulation of heading change beyond the full array. Heading change from the beginning of the vehicle state as turning to the vehicle state of turn complete are also determined aside from heading change for individual array entries. Vehicle state can remain as turning when a longer turn of more than a threshold (such as 150 meters) occurs on a long curvy road. Setting the turn flags remains the same as above. The sum of delta angular velocity is accumulated from the initialization of the vehicle-state to turning until the change in the vehicle state to turn complete. This accounts for the total heading change during the longer duration turn.

(3). Comparing Turn Detection and its History with the Road Database (Data Correlation)

As soon as a turn is completed, the sum of the delta angular velocity (accumulated delta angular velocity from the beginning to the completion of a turn) is converted to get total heading change $\Delta H_G$ (from equation 2, above). Heading change based on the geographic database ($H_M$) is also calculated from the difference of the segment heading at the beginning and end of the turn. Since gyroscope readings are not error free and setting the turning flag begins only after the vehicle is already turning, $\Delta H_G$ is the angle of turn with a small amount of acceptable error (generally less than a configurable threshold, such as about 1 degree which corresponds to about 200 millivolts). Likewise, the road segment heading, as represented in the database, may also have a small amount of error. Considering these two errors, it is acceptable to apply the result of the turn detection algorithm for heading and position correction when the turn angle ($\Delta H_G$) is large enough to compare it with $\Delta H_M$. When the two agree within a given threshold, the dead-reckoned heading is set to the segment heading, as represented in the database. Similarly, dead-reckoned coordinates are set to the coordinates from the geographic database determined to be the current position of the vehicle. Note that $\Delta H_M$ could be different if the positions from the geographic database at the turn start and/or turn completions were incorrect. Instead of a single value, a full set of $\Delta H_g s$ from the history can be compared with a full set of $\Delta H_M$ to find maximum correlation.

According to this alternative embodiment, heading and position correction is applied when the turn angle is greater than approximately five degrees and $\Delta H_G$ and $\Delta H_M$ agree within a given tolerance. The tolerance values may be chosen differently (such as 10 degrees for turns below 50 degrees or 20 degrees for turns above 50 degrees). For II each total heading change, three different values of $\Delta H_M$ are used. The three different values of $\Delta H_M$ are one starting beyond the current array, one at the current array, and the next one immediately following for the default threshold distance. The implementation described above does not rule out the possibility for incorrect use of a segment heading and vehicle position. As a result, in some cases the possibility to correct the dead-reckoned headings and positions could be missed or may be applied incorrectly. This is due in part to not using the full potential of the available information for correlating unambiguously. More importantly, when a vehicle is driven from on-road to off-road or off-road to on-road, use of a single value for turn angle is not useful due to the lack of road segment data for the off-road situation. Use of a complete history with candidate segments from the geographic database is used both for correction to the heading and position while on-road or transition from an on-road/off-road situation.

On-road-driving maneuvers from a current vehicle position are largely constrained by road geometry. A simple example is taking a left or right turn at intersecting roads. Exceptions may include entering a parking lot, driving on a road segment which is not in the geographic database, or other conditions, such as maneuvers made due to road construction. The total maneuvers from a current position to some distance in the past will generally agree with the road geometry. Therefore, heading changes determined from gyroscope readings and those determined from segment headings will generally correspond within a certain threshold. This property can be applied to correct the heading and position immediately when the vehicle-state flag is set to turn-complete from turning, as illustrated in FIG. 5.

Figures 5, 6A, 6B, 6C, 6D:
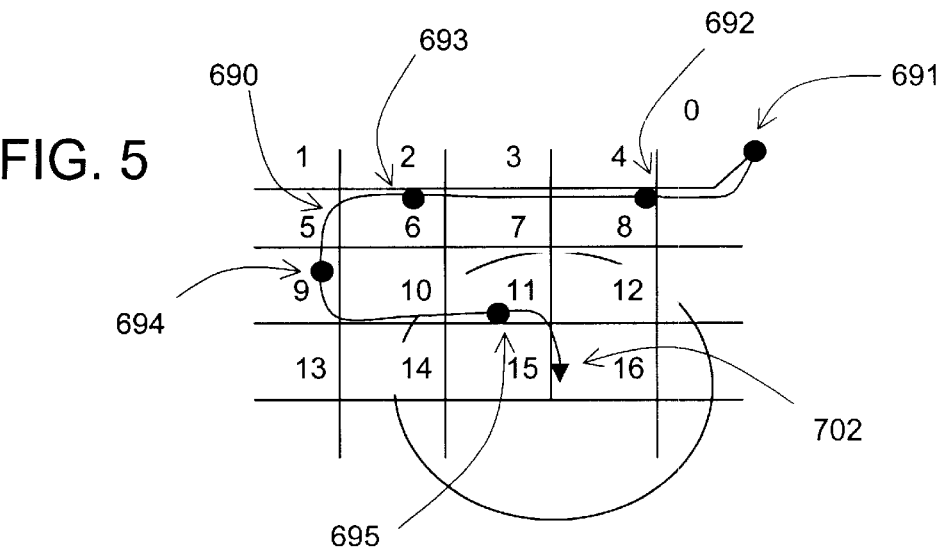
FIG. 5 is an illustration of a portion of a road network and is used to illustrate an embodiment of the vehicle positioning program using data derived from a turn detection algorithm.
FIG. 6A illustrates a vehicle path as determined by the sensor (gyroscope) data according to the embodiment of FIG. 5.
FIG. 6B illustrates a road geometry as determined by the geographic database used by the embodiment of FIG. 5.
FIG. 6C illustrates the path of FIG. 6A overlaid on the road geometry of FIG. 6B at one location according to the embodiment of FIG. 5.
FIG. 6D illustrates the path of FIG. 6A overlaid on the road geometry of FIG. 6B at another location according to the embodiment of FIG. 5.

FIG. 5 shows a plurality of road segments (labeled 0–16), a vehicle path, labeled 690), and positions (labeled 691, 692, 693, 694, and 695) along the vehicle path 690 at which data readings were obtained. If a single turn is executed (from the road segment 11 by the position to the tip of arrow 702), then there are five possible matches within the circle. If another history is added (which includes the last turn shown from the position 694 near the road segment labeled 9), then the number of possible matches is reduced to three. Similarly, if two more turns are added to the history (full course from the road segment labeled 0 to the road segment labeled 15), then there remains only one match, based on the number of turns, the total angle turned in each turning, and an error radius around the current position. With this process, most of the segments located a greater distance from the current dead-reckoned position are eliminated. Correlating the vehicle to the road segment is simplified as soon as a first correlation is established once.

This information can be effectively used to look at the road network and where it fits closely, given the approximate current location. Knowledge of the current heading makes this correlation more efficient and can be used to select only those segments from the geographic database that are close enough to become the probable candidates for correlation assuming the geometry of the map segments closely represents the actual geometry in the real world. In cases where there is a significant difference between the road geometry and the history of the heading change, it may still remain ambiguous until a correlation is found at a later time after a new history becomes available. Depending upon the accuracy of the current location and the accuracy of the coordinates of nodes from the geographic database, it may be necessary to extract segments from the geographic database that cover an area larger than the length of the history. Correlation can then begin from one end of the extracted area and move towards the other end until an acceptable correlation is found. This process can be facilitated if the history of the segment heading and calculated heading are kept so that the correlation can begin by looking at the headings from the two histories. This process is illustrated in connection with FIGS. 6A–6D.

FIG. 6A illustrates a path 710. The path 710 represents the gyroscope history, i.e., the vehicle heading change as indicated by the readings from the gyroscope over a given period of time. The first and the last arrows in FIG. 6A show the beginning and/or the end of the turn. Segments before and after the first and last arrows are straight. At the two middle arrows in FIG. 6A, transition from counter clockwise to clockwise and vice versa occurs. These occurrences are indicated by the amount of heading changes, vehicle state (turn flags), and their locations in the history. Heading and heading changes between road segments as represented by the geographic database can be obtained for an area somewhat larger than the length of the gyroscope history based on the current location. A path 712 based on the data contained in the geographic database is shown in FIG. 6B. A maximum fit in heading changes and location of vehicle state can be found by moving the gyroscope history path 710 over the map history path 712 beginning from one end of the map history. A first attempt to fit is shown in FIG. 6C and a second attempt to fit is shown in FIG. 6D. When the gyroscope history 710 is moved over the map portion history 712 shown in FIG. 6D, a better fit is found between the two sets of data. This best fit provides the heading of the map segment at the current instant that should be used instead of the dead-reckoned heading. Similarly, the distance of the end of the turn from the most recent gyroscope data provides the distance from the node of the map to the current vehicle position on the map. The difference between this position and the dead-reckoned position is the error in the dead-reckoned position. The dots in each of the drawings are placed at the beginning and the end of turns.

As soon as vehicle takes an off-road route, like entering a parking lot or driving on a road segment that does not exist in the geographic database, the degree of correlation between the two sets of data gradually decreases. Similarly, in the case of vehicle entering from off-road to on-road, the degree of correlation will gradually increase.

The map segments to correlate in such cases can be extracted from the database based on the dead-reckoned position. If a large number of road segments are to be extracted, their possibility for correlation can be reduced based on the knowledge of the dead-reckoned heading. Objects are created from the extracted road segments with each object being made up of road segments that have connected nodes with correlating headings and heading differences. The number of objects created is directly related to the number of elements extracted. Objects are also created in cases where more than one segment is joined at a common node. Different object sets are created in such a case if the connected segments to a common node have more or less the same heading. Comparison of turn detection history with each object set from the map will unambiguously distinguish the actual segment on which the vehicle is travelling.

After finding a strong agreement between two sets of data at one time, the process becomes more straightforward with a new history being added and the oldest one deleted. Occasionally the process becomes somewhat longer if the vehicle travels from off-road to on-road or vice versa. The turn detection algorithm should be very effective in correcting the dead-reckoned position and heading in most driving scenarios. The algorithm can be used extensively when the road network contains curves and intersections. It will have a reduced effect in position correction and increased effect in heading correction when the route consists of a long straight road. It can be expected in these cases that the reliability of both GPS position and GPS heading is generally high. The GPS is used to correct the error accumulated in position. Heading correction can be applied more effectively using the segment heading information.

(4). Evaluation of Parameters

The characteristic of a piezoelectric gyroscope is that the angular velocity readings can be affected by change in input-voltage fluctuation, temperature change, and electronic noise, to name a few. It becomes essential to know the change and apply it as a zero-point value (AV0). If this value is not determined for a long time and changed during the interval, it can cause a systematic error, a small one on the delta heading change and a larger one on heading (equations 2 and 3).

There are two algorithms implemented in the vehicle positioning software to learn AV0 dynamically. The first one uses average gyroscope readings when vehicle stops for more than five seconds. The second consists of a correlation of GPS and gyroscope data to find out if the vehicle is traveling straight, and uses an average gyroscope reading for that period as AV0. Both of these methods provide satisfactory results.

Certain driving situations do not allow for either of these methods to correct the AV0 error. The most common of these is driving for a long time with poor GPS reception or large errors in GPS position, while the AV0 value has changed significantly. Using the information collected as a history in the turn detection algorithm can successfully determine this value. This method consists of knowing if the vehicle is travelling along a long straight road segment. In this case, if the history data for gyroscope readings are not changing significantly and the maximum and minimum values lie within a small interval, the average provides the required AV0 value.

Similarly, scale factor for pulses measured by wheel sensor can be effectively determined by using the data from turn detection. The longer portion of lines with vehicle state flag continuously remaining straight can be used to get the distance between the end to end from corresponding GPS points at the two epochs. This distance and accumulated pulses for this period gives pulse scale factor more accurately than using shorter GPS distance between consecutive GPS position.

Another parameter, the scale to convert the gyroscope readings to rotation rate can also be determined if it is unknown or the factory specified value need to be verified. This can be done using sum of total gyroscope readings during a given turn at a road intersection or a curvy section of the road and the angle at that location obtained from the road database. GPS data also gives this angle and can be used to verify the angle. Note however, that generally the GPS turn angle may be less accurate due to slow motion. Low GPS accuracy results generally in intersections in cities, while road database will have no such effect. Unlike the dynamic nature of the zero-point value of a piezoelectric value, this parameter does not change in time. Therefore a more accurate result for this parameter can be obtained using turn detection data collected over time using the least square method.

An embodiment of the vehicle positioning program is used in a navigation system that is similar to the system described in Ser. No. 09/276,377. However, the vehicle positioning programming disclosed in the present specification is not limited to use only in a system like the one described in Ser. No. 09/276,377.

It is intended that the foregoing detailed description be regarded as illustrative rather than limiting and that it is understood that the following claims including all equivalents are intended to define the scope of the invention.

I claim:

1. A method for determining position and heading of a vehicle relative to a road network represented by a geographic database, wherein the method comprises the steps of:

determining a dead-reckoned position and heading along a plurality of road segments in the road network using sensor measurements obtained over a distance traveled by the vehicle;

forming a vehicle trajectory history, wherein the vehicle trajectory history includes sensor-derived data representing a vehicle trajectory over a relatively small, chosen distance, and wherein the sensor-derived data include data indicating a heading change of the vehicle, data indicating a vehicle state and data indicating a type of vehicle maneuver;

obtaining corresponding data for the distance from GPS measurements;

obtaining corresponding data for the distance from the geographic database;

using the data in the vehicle trajectory history and the corresponding data from the GPS and the geographic database to determine a corrected dead-reckoned position and heading; and continuously updating said vehicle trajectory history, wherein the vehicle state includes one of: travelling straight, turning and reversing in turn direction within a specified small distance, and wherein the vehicle state of reversing in turn direction within a specified small distance is determined when a heading change for a current and a previous array entry are opposite in sign and both are greater than a threshold.

2. The method of claim 1 wherein the threshold corresponds to approximately 2.5 degree.

3. A method for determining position and heading of a vehicle relative to a road network represented by a geographic database, wherein the method comprises the steps of:

determining a dead-reckoned position and heading along a plurality of road segments in the road. network using sensor measurements obtained over a distance traveled by the vehicle;

forming a vehicle trajectory history, wherein the vehicle trajectory history includes sensor-derived data representing a vehicle trajectory over a relatively small, chosen distance, and wherein the sensor-derived data include data indicating a heading change of the vehicle, data indicating a vehicle state and data indicating a type of vehicle maneuver;

obtaining corresponding data for the distance from GPS measurements;

obtaining corresponding data for the distance from the geographic database;

using the data in the vehicle trajectory history and the corresponding data from the GPS and the geographic database to determine a corrected dead-reckoned position and heading; and continuously updating said vehicle trajectory history, wherein the vehicle trajectory history includes gyroscope readings, counts of gyroscope readings, delta gyroscope readings, heading change, maximum values of the gyroscope readings, minimum values of the gyroscope readings and a heading determined from dead reckoning, and further wherein similar data are also included for GPS data and the geographic database.

4. The method of claim 3 wherein the vehicle state includes one of: travelling straight, turning and reversing in turn direction within a specified small distance.

5. The method of claim 3 wherein the vehicle state includes one of: travelling straight, turning, reversing in turn direction within a specified small distance, or simple maneuvers, small turns, medium turns, and large turns.

6. The method of claim 3 further comprising the step of:

using the data in the vehicle trajectory history and the corresponding data from the GPS and the geographic database to determine bias and scale factor correction parameters for sensors from which the sensor measurements are obtained.

7. The method of claim 3 wherein the chosen distance is at least approximately 25 meters.

8. The method of claim 3 wherein said vehicle trajectory history is stored as entries in an array maintained in a memory of a navigation system.

9. The method of claim 8 wherein said steps of determining, forming obtaining, obtaining and using are performed by a navigation system installed in said vehicle.

10. A program included as part of a navigation system installed in a vehicle and used for determining position and heading of the vehicle relative to a road network represented by a geographic database, wherein the program comprises:

a routine that determines a dead-reckoned position and heading along a plurality of road segments in the road network using sensor measurements obtained over a distance traveled by tire vehicle;

a routine that forms a vehicle trajectory history, wherein the vehicle trajectory history includes sensor-derived data representing a vehicle trajectory over a relatively small, chosen distance, and wherein the sensor-derived data include data indicating a heading change of the vehicle, data indicating a vehicle state and data indicating a type of vehicle maneuver;

a routine that obtains corresponding data for the distance from GPS measurements;

a routine that obtains corresponding data for the distance from the geographic database;

a routine that uses the data in the vehicle trajectory history and the corresponding data from the GPS and the geographic database to determine a corrected dead-reckoned position and heading; and a routine that continuously updates said vehicle trajectory history, wherein the vehicle state includes one of: travelling straight, turning and reversing in turn direction within a specified small distance, and wherein the vehicle state of reversing in turn direction within a specified small distance is determined when a heading change for a current and a previous array entry are opposite in sign and both are greater than a threshold.

11. The invention of claim 10 wherein the threshold corresponds to approximately 2.5 degree.

12. A program included as part of a navigation system installed in a vehicle and used for determining position and heading of the vehicle relative to a road network represented by a geographic database, wherein the program comprises:

a routine that determines a dead-reckoned position and heading along a plurality of road segments in the road network using sensor measurements obtained over a distance traveled by the vehicle;

a routine that forms a vehicle trajectory history, wherein the vehicle trajectory history includes sensor-derived data representing a vehicle trajectory over a relatively small, chosen distance, and wherein the sensor-derived data include data indicating a heading change of the vehicle, data indicating a vehicle state and data indicating a type of vehicle maneuver;

a routine that obtains corresponding data for the distance from GPS measurements;

a routine that obtains corresponding data for the distance from the geographic database;

a routine that uses the data in the vehicle trajectory history and the corresponding data from the GPS and the geographic database to determine a corrected dead-reckoned position and heading; and a routine that continuously updates said vehicle trajectory history, wherein the vehicle trajectory history includes gyroscope readings, counts of gyroscope readings, delta gyroscope readings, heading change, maximum values of the gyroscope readings, minimum values of the gyroscope readings and a heading determined from dead reckoning, and further wherein similar data are also included from GPS data and the geographic database.

13. The invention of claim 12 wherein said vehicle trajectory history is stored as entries in an array maintained in a memory of the navigation system.

14. The invention of claim 12 wherein the vehicle state includes one of: travelling straight, turning, reversing in turn direction within a specified small distance, or simple maneuvers, small turns, medium turns, and large turns.

15. The invention of claim 12 further comprising:

a routine that uses the data in the vehicle trajectory history and the corresponding data from the GPS and the geographic database to determine bias and scale factor correction parameters for sensors from which the sensor measurements are obtained.

16. The invention of claim 12 wherein the chosen distance is at least approximately 25 meters.

17. The invention of claim 12 wherein the vehicle state includes one of: travelling straight, turning and reversing in turn direction within a specified small distance.

* * * * *